Aug. 16, 1927.

O. R. SCHOENROCK 1,639,470

THROTTLE VALVE CONTROL MEANS

Filed April 7, 1921    2 Sheets-Sheet 1

Inventor:-
Otto R. Schoenrock,
By [signature]
Atty.

Aug. 16, 1927.  1,639,470
O. R. SCHOENROCK
THROTTLE VALVE CONTROL MEANS
Filed April 7, 1921   2 Sheets-Sheet 2

Inventor:-
Otto R. Schoenrock,
By H.P. Darling
Atty.

Patented Aug. 16, 1927.

1,639,470

UNITED STATES PATENT OFFICE.

OTTO R. SCHOENROCK, OF CHICAGO, ILLINOIS, ASSIGNOR TO INTERNATIONAL HARVESTER COMPANY, A CORPORATION OF NEW JERSEY.

THROTTLE-VALVE CONTROL MEANS.

Application filed April 7, 1921. Serial No. 459,490.

My invention relates to throttle control means for internal combustion engines, and is particularly adapted to use with engines mounted on tractors, trucks and other motor vehicles.

An object of my invention is to provide a compact, easily operated controlling means that has a minimum of parts.

Another object is to provide a spark and throttle controlling means adapted to be used with a governor controlled engine.

The above and other objects will be apparent from the following description of the embodiment of the invention illustrated in the accompanying drawings, in which—

Figure 1:
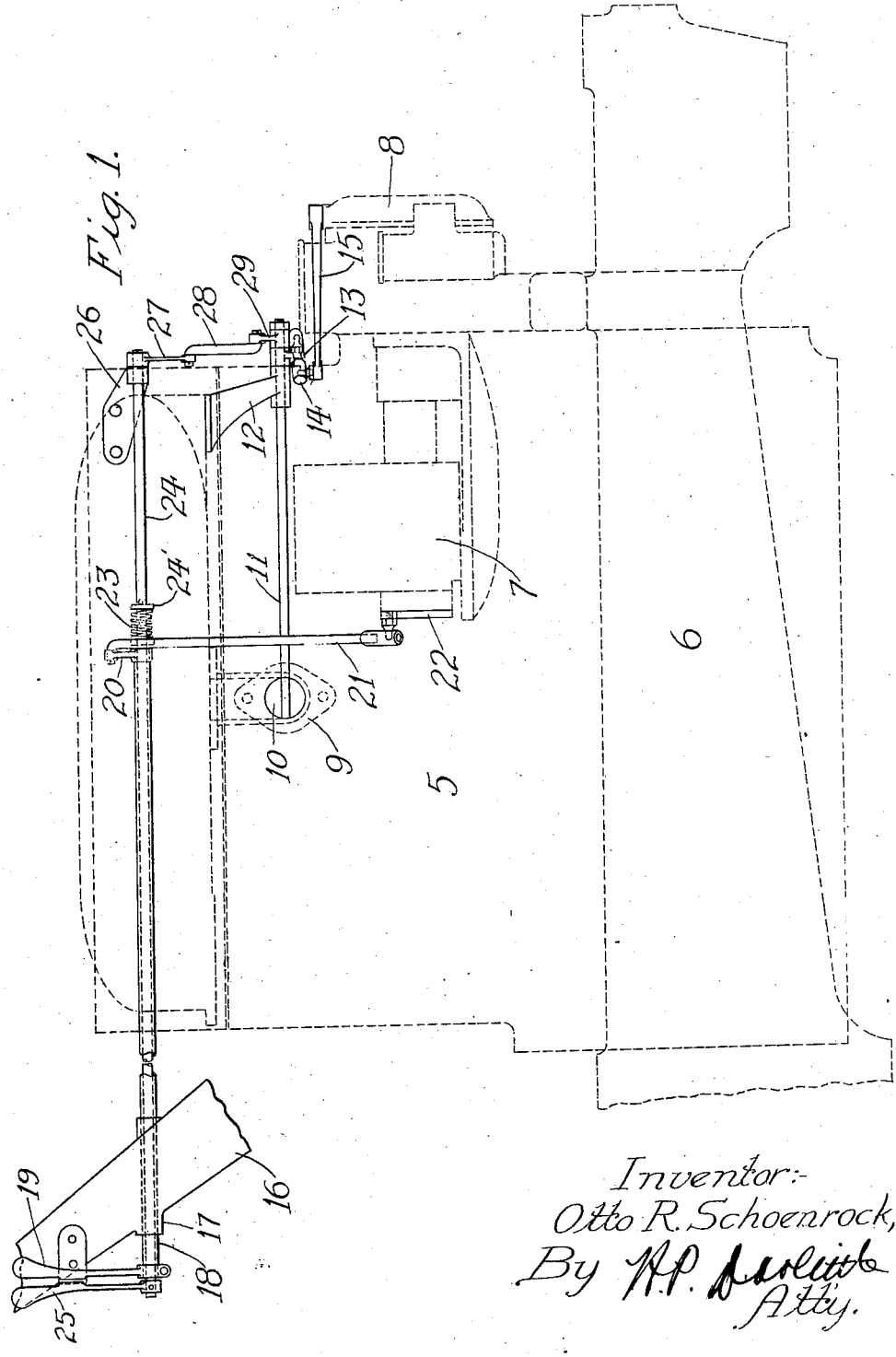
Fig. 1 is a side elevation of the invention applied to an engine mounted on a tractor.

An engine 5 mounted on the frame members 6, 6 of a tractor has a magneto 7 and a governor 8 driven by gearing from the engine crank shaft. The engine is provided with the usual intake 9 controlled by the throttle valve 10 which has an elongated stem 11 supported in a bracket 12 secured to the forward end of the engine. The stem has secured to its forward end a lever 13 connected by a link 14 to the governor arm 15. Through the connections just described the governor operates to control the throttle valve 10 and keep the speed of the engine substantially constant under varying loads.

The steering post 16 carried by the tractor frame is provided with a horizontal bearing 17 which is journaled one end of a hollow shaft or rod 18 having a spark control lever 19 secured to its rear end. The hollow rod extends forwardly through the bearing and carries a lever 20 at its forward end to which one end of the link 21 is pivotally connected, the other end of the link being connected to the timer 22 of the magneto 7. By shifting the spark control lever 19 the timer 22 is adjusted to time the ignition of the charges.

Figure 3:
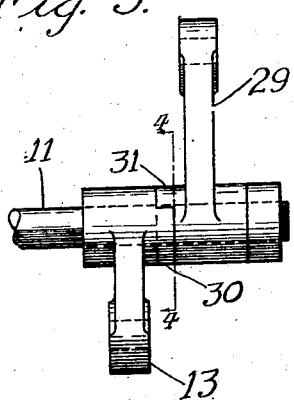
Fig. 3 is a detail of the throttle control means and—
Figure 4:
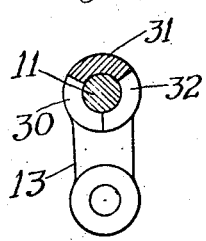
Fig. 4 is a section on the line 4—4 of Fig. 3.

Journaled in the hollow shaft 18 is a horizontally extending shaft or rod 24 having a throttle control lever 25 secured to its rear end, its forward end being supported in a bracket 26 secured to the forward end of the engine. A coil spring 23 surrounding the shaft 24 abuts at one end against the hollow shaft 18 and at its other end contacts with a collar 24' on the shaft 24 to prevent relative longitudinal movement of the two shafts. The forward end of the shaft 24 carries an arm 27 to which one end of a link 28 is pivotally connected, the other end of the link being connected to an arm or lever 29 journaled loosely on the valve stem 11 adjacent the lever 13. The lever 13 has a segment 30 embracing substantially 120° and the lever 29 has a similar segment 31 extending over about the same angle. When the two segments 30 and 31 are in contact, as shown in Figures 3 and 4, an open space 32 of approximately 120° is left between the two segments so that either lever 13 or 29 may be rotated through this angle without affecting the position or adjustment of the other lever.

Figure 2:
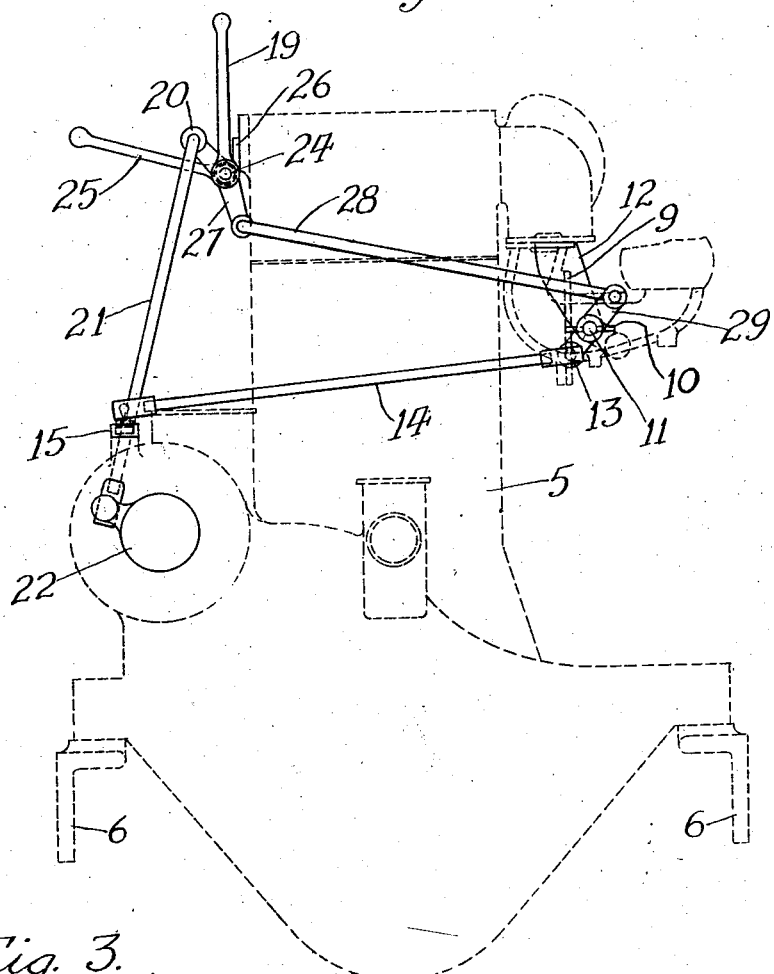
Fig. 2 is an end elevation looking from right to left in Fig. 1.

It will be noted that in Figure 1 the throttle control lever 25 is shown in the position which it occupies when the valve 10 is completely closed, while in Figure 2 the throttle 10 is shown opened to its maximum amount. The position of the levers in Figures 3 and 4 corresponds to their position in Figure 2; that is, the throttle valve is open to its maximum amount when the two segments 30 and 31 are in contact as shown in Figure 4. It will be evident from an inspection of the parts that the throttle control lever 25 may be operated to close the throttle valve 10 against the action of the governor, but that it cannot open the valve beyond the position determined by the governor as controlled by the speed of the engine. Assuming that the engine has been stopped and it is desired to start the same, the throttle control lever 25 will be turned down to the right or to the position shown in Figure 2. This will enable the governor spring to actuate the lever 15 and through the rod 14 and control lever 13 to open the throttle valve. The spark lever 19 is turned down in the same direction as the throttle control lever 25 to retard the spark. The engine is then turned over by cranking or by the starter to start the engine. As the engine speeds up the governor will operate to close the throttle valve until the speed of the engine becomes normal. It is to be noted that while the throttle valve cannot be opened by the manually controlled means beyond the point determined by the speed of the engine and controlled by the governor, that the throttle may be set by means of the lever 25 to determine a maximum point beyond which the governor cannot open the throttle and also that the throttle may be manually closed to regulate the speed of the engine at points below the normal speed determined by the governor.

While I have shown my invention applied to an engine having a magneto 7 and a timer 22, it is to be understood that this is but illustrative of the invention and that any other ignition system could be substituted for the magneto without departing from the spirit of my invention.

Having thus described my invention, what I claim as new and desire to secure by Letters Patent is:

1. In combination, an engine, a governor, a throttle valve having a stem, said valve controlling the supply of motive fluid to the engine, a lever secured to the stem, operating means connecting the lever and governor, a second lever journaled on the stem adjacent the first named lever, segmental portions on the levers, and means for adjusting the position of the second lever on the stem, the segments on the levers engaging each other when the throttle valve has been opened to a predetermined extent by the governor.

2. In combination, an engine, a governor, a throttle valve having a stem, a lever secured to the stem, means connecting the lever and governor whereby the governor may control the position of the throttle valve and speed of the engine, a second lever journaled on the stem, manually operated means for actuating the second lever, and cooperating segments on the levers whereby the segment on the second lever will engage the segment on the first lever to close the throttle and the segment on the first lever will engage the segment on the second lever to limit the opening of the throttle by the governor.

3. In a motor vehicle having a steering post and an engine provided with a throttle valve and a governor, the combination of an elongated stem for the throttle valve journaled in a bracket carried on the engine, a lever secured to the stem, means connecting the lever to the governor whereby the governor may control the valve, a second lever journaled on the valve stem, a rod journaled on the steering post and engine and arranged substantially parallel with the valve stem, means connecting said rod with said second lever, and means for rocking said rod to operate said second lever to operate the throttle valve independently of the connection to the throttle valve from the governor.

4. In a motor vehicle having a steering post and an engine provided with a throttle valve and a governor, the combination of an elongated stem for the throttle valve journaled in a bracket carried on the engine, a lever secured to the stem, means connecting the lever to the governor whereby the governor may control the valve, a second lever journaled on the valve stem, a rod journaled on the steering post and engine and arranged substantially parallel with the valve stem, means connecting said rod with said second lever, and interengaging portions on said levers whereby the second lever may be adjusted upon movement of said rod to limit the operation of the first lever controlled by the governor.

In testimony whereof I affix my signature.

OTTO R. SCHOENROCK.